GEORGE L. DAMON.
Improvement in Bolts for Safes, &c.
No. 4,389. Reissued May 23, 1871.
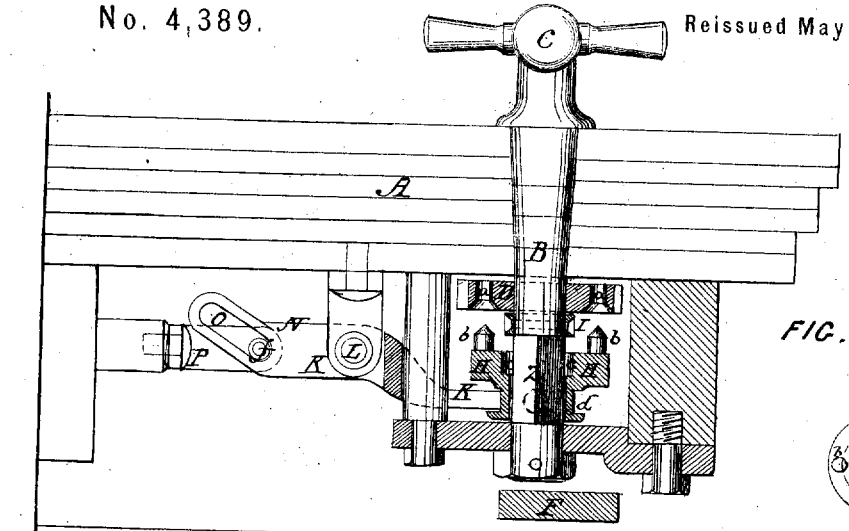
FIG. 1.
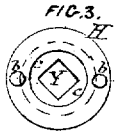
FIG. 2.
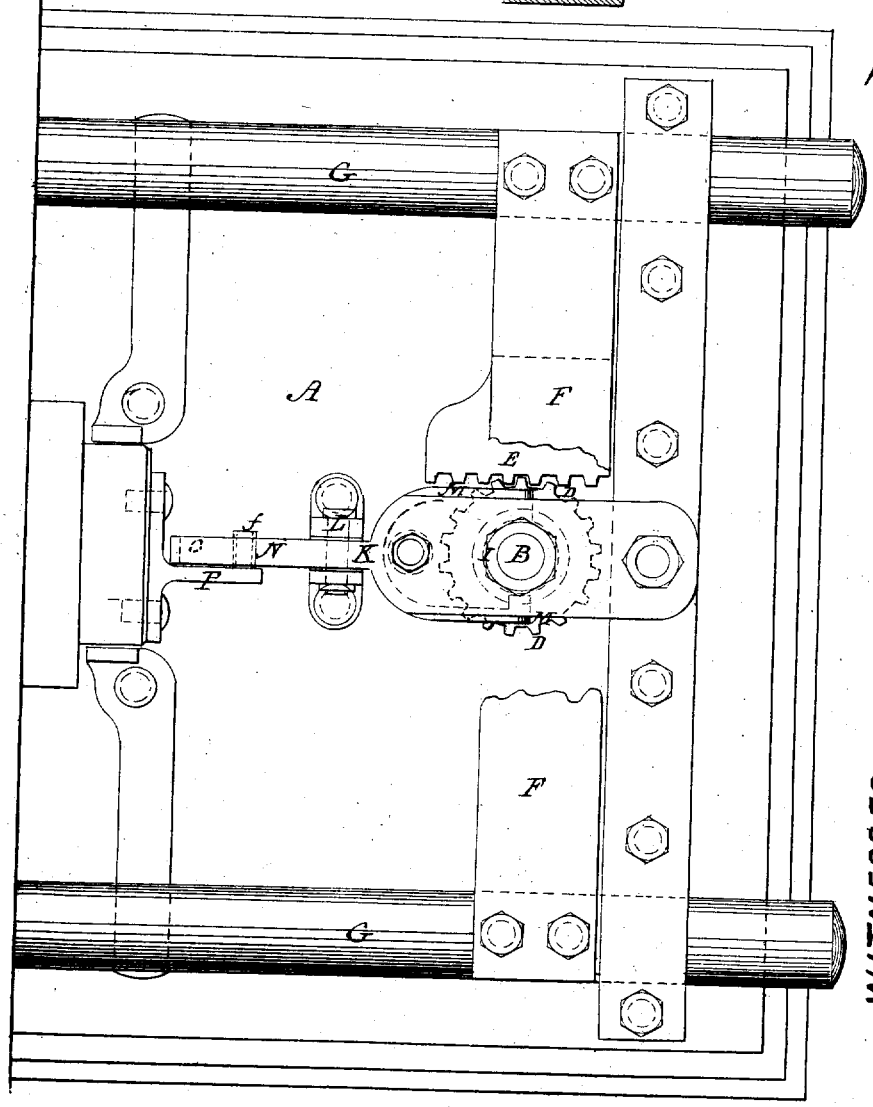
INVENTOR.
Geo. L. Damon
WITNESSES.
Albert H. Burr.
Daniel Flaherty.
AM. PHOTO-LITHOGRAPHIC CO. N.Y. (OSBORNE'S PROCESS.)

United States Patent Office.

GEORGE L. DAMON, OF CAMBRIDGE, MASSACHUSETTS.

Letters Patent No. 102,780, dated May 10, 1870; reissue No. 4,389, dated May 23, 1871.

IMPROVEMENT IN BOLTS FOR SAFES, &c.

The Schedule referred to in these Letters Patent and making part of the same.

*To all whom it may concern:*

Be it known that I, GEORGE L. DAMON, of Cambridge, in the county of Middlesex and State of Massachusetts, have invented a new and useful Improvement in Detachable Revolving Shaft and Gear for Safes, &c.; and that the following is a full and exact description of the same, reference being had to the accompanying drawing.

The present invention relates to such safes as are provided with a shaft having a knob or handle on the outside of the door for throwing the bolts after the lock is unlocked.

The invention consists of arranging upon the spindle for throwing the bolts a wheel which is loose thereon and is in constant connection with the bolts, and a sleeve adapted to turn with the said spindle, and both relatively so arranged as, by and through the operation of the lock employed, to be moved the one toward or away from the other, and so constructed as to be interlocked with each other.

In the accompanying drawing my improved detachable revolving shaft and gear for safes, &c., are illustrated—

Figure 1 being a partial plan and horizontal sectional view of the same, and

Figure 2 a view of the inside face of a door, showing the bolts thereof and the parts comprehended in this invention.

Figure 3, a face or end view of the sleeve on bolt-throwing spindle.

A in the drawing represents a portion of a safe-door.

B, a shaft arranged through the thickness of door A, projecting beyond both the inside and outside faces thereof, and constructed and adapted to be turned in the ordinary way.

This shaft B, on outside of safe-door A, is provided with a knob or handle, C, for convenience in turning it.

On inside of safe-door the shaft B is provided with a loose pinion-wheel, D, suitably retained from lateral movement, the teeth of which interlock with the teeth of a toothed rack-bar, E, on the rail F, fixed to and carrying the bolts G, arranged in parallel planes to move through suitable upright guide-bars attached to the safe-door.

The pinion-wheel D is constructed about the center and through its thickness with sockets or holes *a*.

H, a sleeve having square hole Y through its center.

This sleeve H is arranged on corresponding square portion Z″ of shaft B, beyond the pinion-wheel D, and is free to be slid thereon.

This sleeve H, on its face opposite to the pinion-wheel D, is constructed with pins or studs *b*, corresponding in position to the holes *a* of pinion-wheel, so that the sleeve, in sliding it toward and against said wheel, can be interlocked therewith.

This sleeve H is constructed with an opening or recess, C, about the shaft B, corresponding to which, at the pinion-wheel D, is a collar, I, fixed on shaft B so as to turn therewith.

The sleeve H, when interlocked with the pinion-wheel by the relative pin-and-hole construction described, establishes a connection between the bar-carrying bolts and the shaft B, securing the throw of the bolts by the turning of the shaft B.

To slide the sleeve into and out of the connection above described, and to secure such movement from the action of the locking mechanism, a lever, K, is provided.

This lever is hung to a fulcrum at L of the door A, and at one end, M, is made in the form of a clutch, connecting by its jaws with the groove *d* of sleeve H, and at the other end, N, is made with an angular slot, O, hung upon a stud or pin, *f*, of the bolt P, to any suitable locking mechanism.

The connection between the clutch of lever K and sleeve H is such that, while the movement of the lever K will slide the sleeve, it will offer no hindrance to the free revolution of the sleeve H by the shaft B, when in connection as described.

The direction of the angular slot O to lever K is such as, by the locking and unlocking of the lock, to slide the sleeve in the one case out of and in the other into connection with the loose pinion-wheel D.

With an arrangement of parts such as above described it is apparent the bolts and the shaft for operating them are disconnected when the safe is locked, the shaft in them being turned having no effect on the bolts; consequently a burglar or other outside operator cannot feel the bolts in the turning of the shaft B.

The locking mechanism to be employed in connection with my detachable revolving shaft and gear for safes may be of any of the well-known safe-locks; as, for instance, the "Sargent combination-lock."

Having thus described my invention, I shall state my claim as follows:

What I claim, and desire to secure by Letters Patent, is—

1. The shaft B, provided with the sleeve H and the wheel D, when arranged to operate the bolts G, as described, for the purpose specified.

2. The combination of the pinion-wheel D, sleeve H, and pivoted slotted lever K, substantially as and for the purpose described.

GEO. L. DAMON.

Witnesses:
ALBERT W. BROWN,
DANIEL FLAHERTY.